United States Patent
Li

(10) Patent No.: US 10,875,788 B2
(45) Date of Patent: Dec. 29, 2020

(54) SYSTEM AND METHOD FOR DESALINIZATION OF WATER USING SOLAR THERMAL ENERGY

(71) Applicant: Arizona Board of Regents on Behalf of the University of Arizona, Tucson, AZ (US)

(72) Inventor: Peiwen Li, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 0 days.

(21) Appl. No.: 16/313,808

(22) PCT Filed: Jun. 28, 2017

(86) PCT No.: PCT/US2017/039757
§ 371 (c)(1),
(2) Date: Dec. 27, 2018

(87) PCT Pub. No.: WO2018/005648
PCT Pub. Date: Jan. 4, 2018

(65) Prior Publication Data
US 2019/0225508 A1    Jul. 25, 2019

Related U.S. Application Data

(60) Provisional application No. 62/355,762, filed on Jun. 28, 2016.

(51) Int. Cl.
*C02F 1/14* (2006.01)
*B01D 1/26* (2006.01)
(Continued)

(52) U.S. Cl.
CPC .............. *C02F 1/14* (2013.01); *B01D 1/0035* (2013.01); *B01D 1/18* (2013.01); *B01D 1/26* (2013.01);
(Continued)

(58) Field of Classification Search
CPC ........ B01D 3/146; B01D 3/148; B01D 5/006; B01D 1/00; B01D 1/0035; B01D 1/18;
(Continued)

(56) References Cited

U.S. PATENT DOCUMENTS 3,961,658 A    6/1976 Pagani
2010/0012784 A1    1/2010 Bourgault

OTHER PUBLICATIONS

Li et al., "Heat and Mass Transfer Analysis of a Water and Solute Separation System: Using Solar Thermal Energy for Water Desalination", Proceedings of the ASME 2015 9th International Conference on Energy Sustainability, 2015, http://proceedings.asmedigitalcollection.asme.org/proceeding.aspx?articleid=246756>, entire document.

Primary Examiner — Brian A McCaig
(74) Attorney, Agent, or Firm — Blank Rome LLP

(57) ABSTRACT

A device and method of thermal-driven water treatment to fully separate water and solute using a heat source such concentrated solar thermal energy are disclosed herein. The claimed device is integrated to a multi-effect-distillation water treatment system to achieve high energy efficiency and 100% water extraction using high temperature solar thermal energy. In the disclosed water treatment system, water for reclamation is sprayed into droplets which fall into hot, dry air and creates very effective convective heat transfer between water droplets and hot airflow. During the heat transfer process, water is vaporized for pure water collection while the crystallized solute from the reclamation water to the bottom for collection.

24 Claims, 8 Drawing Sheets

(51) Int. Cl.
   *B01D 1/00* (2006.01)
   *B01D 1/18* (2006.01)
   *B01L 1/00* (2006.01)
   *C02F 1/12* (2006.01)
   *B01D 3/14* (2006.01)
   *B01D 5/00* (2006.01)
   *C02F 103/08* (2006.01)

(52) U.S. Cl.
   CPC .............. *B01D 3/146* (2013.01); *B01D 3/148* (2013.01); *B01D 5/006* (2013.01); *B01L 1/00* (2013.01); *C02F 1/12* (2013.01); *C02F 2103/08* (2013.01); *C02F 2201/002* (2013.01); *C02F 2209/02* (2013.01); *Y02A 20/124* (2018.01); *Y02A 20/212* (2018.01)

(58) Field of Classification Search
   CPC ..... B01D 1/26; C02F 1/12; C02F 1/14; Y02A 20/128; Y02A 20/212
   See application file for complete search history.

SYSTEM AND METHOD FOR DESALINIZATION OF WATER USING SOLAR THERMAL ENERGY

CROSS REFERENCE TO RELATED APPLICATIONS

This application is a national phase application of PCT/US2017/039757, filed Jun. 28, 2017, which claims priority to U.S. Provisional Application No. 62/355,762, filed Jun. 28, 2016. The entire contents of the above-referenced applications are hereby incorporated by reference.

BACKGROUND

Field of the Invention

This invention relates to a system and method of thermal-driven water treatment to fully separate water and dissolved solute. More particularly, the invention relates to a system and method wherein water for reclamation is sprayed into droplets which fall into hot, dry air thereby creating effective convective heat transfer between the water droplets and the hot air. The water droplets are vaporized for pure water collection, whereas the solute dissolved in the water is crystallized and settles to the bottom of a collection vessel.

Description of Related Art

It is generally known that water treatment is very energy consuming, either using membrane-based technologies, or thermal-based evaporation technologies. It is therefore highly desirable that waste heat from industrial processes or heat from solar thermal energy be used for water treatment, which minimizes the consumption of energy from using fossil fuels. Fortunately, many arid areas in the world are abundant of solar energy, which may be used to treat water including impaired water or seawater from a distance away. The current invention utilizes concentrated solar thermal energy for treatment of water using thermal-driven water technologies. The use of high temperature solar thermal energy has the potential of increasing energy efficiency.

Conventional thermal-driven water treatment technologies include multi-stage flashing (MSF) and multi-effect distillation (MED). These technologies work fairly effectively at temperatures below 90° C. in order to avoid scaling and heat transfer degradation due to the crystallization of calcium and magnesium salts on heat transfer surfaces.

In the cases of seawater desalination, the disposal of high concentrated brine is a big issue, which is currently simply avoided by pumping the concentrated brine back to the sea. Therefore, only less than 20% of the water is extracted to avoid adverse impact to marine environments and sea life. For inland water desalination, disposal of residual is also an environmental concern.

Recent technology developments in solar thermal energy storage confirm that sea salts are very promising materials for large scale thermal energy storage. This may dramatically change the technology for desalination and water treatment because the salts may be collected for better value, rather than disposed. Complete separation of salts and water for water treatment in previous water treatment technologies is lacking. It is understandable that the disposal of a large quantity of residual can also cause environmental problem. Therefore, minimization of residual material, whether useful or not, is very important to improvements in water treatment technologies.

BRIEF DESCRIPTION OF THE DRAWINGS

The accompanying figures illustrate embodiments and serve to explain principles of the disclosed embodiments. It is to be understood, however, that these figures are presented for purposes of illustration only, and not for defining limits of the present invention.

DESCRIPTION

Figure 1:
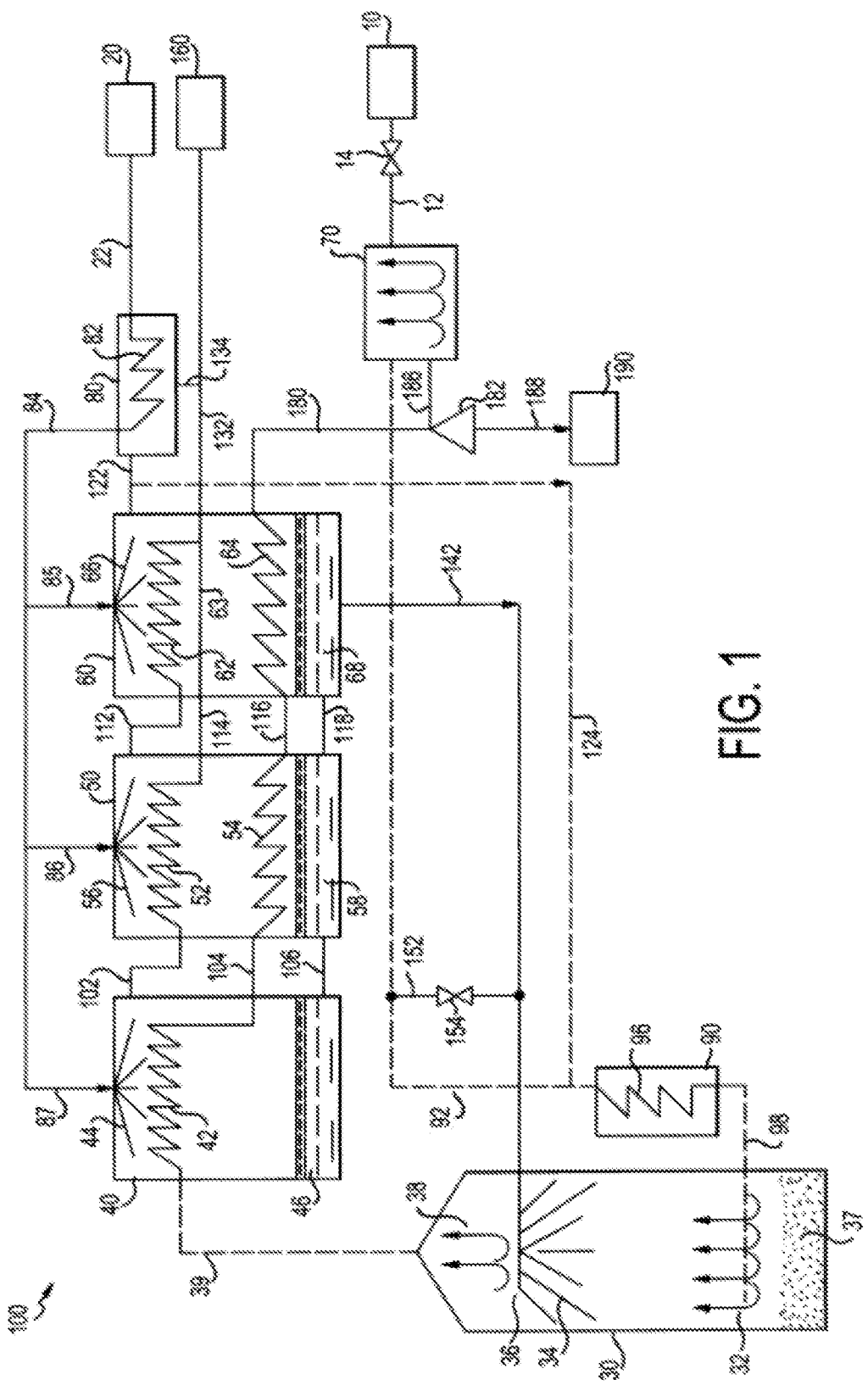
FIG. 1 is a schematic illustration of a full-separation multi-effect distillation (FSMED) desalinization system wherein a full-separation tank (FST) tank is integrated with a forward feed multi-effect distillation (MED) in accordance with various aspects of the present disclosure.

Exemplary, non-limiting embodiments of the present application will now be described with references to the above-mentioned figures. Particularly, embodiments of the application comprise parts or method steps that are similar or identical to each other. These parts or method steps are thus denoted with similar or identical names or reference numerals. Description of these relevant parts of method steps is hereby incorporated by reference, wherever relevant or appropriate.

As used throughout, ranges are used as shorthand for describing each and every value that is within the range. Any value within the range can be selected as the terminus of the range.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "fluidically coupled" refers to the permanent or reversible, direct or indirect, linking or connection of two objects such that fluids may flow, in a single direction or in more than one direction, from one object to another. The term "fluid communication" refers to objects which are in contact with, but not necessarily coupled with or connected to, one another, whereby a fluid can pass from one object to the other. The term "substantially" refers to an element essentially conforming to the particular dimension, shape or other word that substantially modifies, such that the component need not be exact. For example, substantially cylindrical means that the object resembles a cylinder, but can have one or more deviations from a true cylinder.

In the present application, the term "conduit" is defined as piping, tubing, or any other suitable structure through which a fluid, such as a liquid or gas, is conveyed from one component to another.

Presently, over one-third of the world's population lives in water-stressed countries and by 2025, this figure is predicted to rise to as high two-thirds of the world's population. It is therefore incumbent on researchers and engineers to develop advanced water treatment technologies to increase the reuse of water or reduce the waste of clean water.

The systems and methods disclosed herein combine a forward feed multi-effect distillation (MED) systems and a full-separation tank (FST). The air feed to the FST is preheated by an exhaust air/steam mixture to enable heat recovery. The FST receives concentrated brine from the previous or upstream effect. The brine is atomized into tiny droplets and made to pass through stream of hot air. While doing so the brine vaporizes, forming steam and leaving behind salt. The separated salt will trickle down and get collected at the bottom of FST. The hot air and steam from FST are passed through first effect of multi-effect distillation (MED) where they evaporate feed sea water resulting in formation of steam and brine. Subsequently the steam from first effect is passed to next effect for condensation, from which the heat is used to evaporate the incoming brine of the next effect and so on with more effects until a significant amount of water is extracted. The current technology overcome above-discussed temperature limitations of heat used for water desalination. High temperature heat from heating elements utilizing concentrated solar thermal energy or another suitable heat source will be used in special devices/ systems to completely separate salt and water.

In the improved water treatment systems disclosed herein, a forward feed MED system is combined with a separation tank. In operation, the air feed to the separation tank is preheated by an exhaust air/steam mixture to enable heat recovery. The separation tank receives concentrated brine from the previous or upstream effect. The brine is atomized into tiny droplets and made to pass through stream of hot air. While doing so the brine vaporizes, forming steam and leaving behind salt. The separated salt will trickle down and get collected at the bottom of separation tank. The hot air and steam from the separation tank are passed through a first effect of the MED where they evaporate feed sea water resulting in formation of steam and brine. Subsequently the steam from first effect is passed to next effect for condensation, from which the heat is used to evaporate the incoming brine of the next effect and so on with more effects until a significant amount of water is extracted.

FIG. 1 is a schematic illustration of a full-separation multi-effect distillation (FSMED) desalinization system in accordance with various aspects of the present disclosure. The FSMED combines a forward feed MED system and a full-separation tank (FST). The main components of the MED section include evaporation effects and heat exchangers. The FST is combined with MED sections. The air feed to the FST is preheated by the exhaust air/steam mixture to have heat recovery. The FST receives concentrated brine from the last effect. The brine is atomized into tiny droplets and made to pass through stream of hot air. While doing so, the brine droplets vaporize, forming steam and leaving behind salt. The separated salt will trickle down and get collected at the bottom of FST. The hot air and steam from the FST are passed through the first effect of the MED where they evaporate feed sea water resulting in the formation of steam and brine. Subsequently the steam from the first effect is passed to the next effect for condensation, from which the heat is used to evaporate the incoming brine of the next effect and so on with more effects until a significant amount of water is extracted.

The FSMED desalinization system 100 includes a dry air source 10, a saltwater/brackish water source 20, a full-separation tank (FST) 30, a first evaporation/distillation tank 40 (also described herein as a first effect), a second evaporation/distillation tank 50 (also described herein as a second effect), and a third evaporation/distillation tank 60 (also described herein as a third effect). Dry air is transmitted from the dry air source 10 to a humidifier 70 via a conduit 12 to humidify the dry air. The conduit 12 can have a valve 14 to fully or partially restrict or control the flow of dry air from the dry air source 10 to the humidifier 70. The humidified air is then transmitted to a heating element 90 via a conduit 92. Steam is also transmitted to the heating element 90 from the third evaporation/distillation tank 60 via a conduit 124 as will be further described below. The humidified air and steam mixture passes through coiled tubing 96 and is heated by the heating element 90. The humidified air and steam mixture can be heated from about 100° C. to about 1000° C., alternatively about 100° C. to about 800° C., alternatively about 100° C. to about 600° C., and alternatively about 100° C. to about 400° C. in the heating element 90. The heated humidified air and steam mixture is then transmitted to the FST 30 via conduit 98 and is emitted into a lower interior location of the FST 30 as a hot vapor 32. A final concentrated brine solution 68 is transmitted to an upper interior portion of the FST 30 from the third evaporation/distillation tank 60 via a conduit 142 as will be further discussed below. The concentrated brine solution 68 is converted to a droplet spray 34 by an atomizer 36. The atomizer 36 can have any configuration that allows for the conversion of the concentrated brine solution 68 to droplets of concentrated brine. The droplets of the spray 34 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm.

In some instances, at least a portion the humidified air can be added to the concentrated brine solution 68 from the conduit 92 to the conduit 142 via a conduit 152. The conduit 152 can have a valve 154 to fully or partially restrict or control the flow of the humidified air from the conduit 92 to the conduit 142.

In the FST 30 the droplet spray 34 is heated by the hot vapor 32 causing the droplet spray 34 to evaporate to form solid salt/dry material 37, which can collect at the bottom of the FST 30, and steam 38. The steam 38 is then transmitted from the FST 30 to the first evaporation/distillation tank 40 via a conduit 39.

Cold saltwater/brackish water is transmitted from the saltwater/brackish water source 20 to a heating element 80 via a conduit 22. The cold saltwater/brackish water passes through coiled tubing 82 and is heated by steam. The steam is supplied by the third evaporation/distillation tank 60 via a conduit 122 as will be discussed further below. Heated saltwater/brackish water is then transmitted from the heating element 80 to each evaporation/distillation tank 40, 50, and 60 via conduit 84 and conduits 85, 86, and 87.

In the first evaporation/distillation tank 40, heated saltwater/brackish water from the heating element 80 is converted to a droplet spray 44 by an atomizer (not shown), and the steam transmitted from the FST 30 to the first evaporation/distillation tank 40 via conduit 39 is circulated into a condensation tube 42. The atomizer can have any configuration that allows for the conversion of the heated saltwater/brackish water to droplets of saltwater/brackish water. The droplets of the spray 44 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. Heat from the steam is transferred to the condensation tube 42 and radiates into the first evaporation/distillation tank 40. The steam concomitantly cools and condenses to form liquid water in the condensation tube 42. The radiant heat heats the droplets of the spray 44, converting the droplets to steam and a first concentrated brine solution 46. The steam formed in the first evaporation/distillation tank 40 is then transmitted to the second evaporation/distillation tank 50 via a conduit 102. The condensed water and any steam remaining in the condensation tube 42 is transmitted to the second evaporation/distillation tank 50 via conduit 104. The first concentrated brine solution 46 is transmitted to the second evaporation/distillation tank 50 via conduit 106.

In the second evaporation/distillation tank 50, heated saltwater/brackish water from the heating element 80 is converted to a droplet spray 56 by an atomizer (not shown). The atomizer can have any configuration that allows for the conversion of the heated saltwater/brackish water to droplets of saltwater/brackish water. The droplets of the spray 56 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. The steam transmitted from the first evaporation/distillation tank 40 via conduit 102 is circulated through a condensation tube 52. The condensed water and any remaining steam is transmitted from the first evaporation/distillation tank 40 via conduit 104 is circulated through a condensation tube 54. Heat from the condensed water and/or steam is transferred from the condensation tubes 52, 54 and radiates into the second evaporation/distillation tank 50. The steam concomitantly cools and condenses to form liquid water in the condensation tubes 52, 54. The radiant heat heats the droplets of the spray 56, converting the droplets to steam and a concentrated brine which combines with the first concentrated brine solution 46 to form a second concentrated brine solution 58. The steam formed in the second evaporation/distillation tank 50 is then transmitted to the third evaporation/distillation tank 60 via a conduit 112. The condensed water and any steam remaining in the condensation tube 52 is transmitted to the third evaporation/distillation tank 60 via conduit 114. The condensed water and any steam remaining in the condensation tube 54 is transmitted to the third evaporation/distillation tank 60 via conduit 116. The second concentrated brine solution 58 is transmitted to the third evaporation/distillation tank 60 via conduit 118.

In the third evaporation/distillation tank 60, heated saltwater/brackish water from the heating element 80 is converted to a droplet spray 66 by an atomizer (not shown). The atomizer can have any configuration that allows for the conversion of the heated saltwater/brackish water to droplets of saltwater/brackish water. The droplets of the spray 66 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. The steam, transmitted from the second evaporation/distillation tank 50 via conduit 112, is circulated through a condensation tube 62. The condensed water and any remaining steam, transmitted from the second evaporation/distillation tank 50 via conduits 114, 116, is circulated through a condensation tubes 63, 64. Heat from the condensed water and/or steam is transferred to the condensation tubes 62, 63, 64 and radiates into the third evaporation/distillation tank 60. The steam concomitantly cools and condenses to form liquid water in the condensation tubes 62, 63, 64. The radiant heat heats the droplets of the spray 66, converting the droplets to steam and a concentrated brine which combines with the second concentrated brine solution 58 to form the final concentrated brine solution 68. The steam formed in the third evaporation/distillation tank 60 is then transmitted to the heating element 80 via a conduit 122. A portion of the steam formed in the third evaporation/distillation tank 60 can also be transmitted to the heating element 90 via the conduit 124 as discussed above. The conduit 124 can have a valve (not shown) to fully or partially restrict or control the flow of steam from the conduit 122 to the heating element 90. The condensed water and any steam remaining in the condensation tube 62 is transmitted to the condensation tube 63.

The water and any steam remaining in the condensation tube 63 exits the third evaporation/distillation tank 60 via conduit 132. Liquid water in the conduit 132, now purified, is transmitted to a pure water storage 160. The steam transmitted to the heating element 80 via a conduit 122 heats the cold saltwater/brackish water circulating through the coiled tubing 82. As the steam heats the cold saltwater/brackish water, the corresponding energy loss causes the steam to condense and form purified liquid water in the heating element 80 which is transmitted to the pure water storage 160 via conduits 134 and 132.

The liquid water and any steam remaining in the condensation tube 64 exits the third evaporation/distillation tank 60 via conduit 180. The liquid water and remaining steam are diverted into two different paths using a liquid/gas separator 182, wherein the liquid water, now purified, is transmitted to a pure water storage 190 via conduit 188 and the remaining steam is transmitted to the humidifier 70 via conduit 186 to humidify the dry air from the dry air source 10 as discussed above.

In FIG. 1, the FSMED desalinization system 100 is illustrated as having three evaporation/distillation tanks 40, 50 and 60, respectively. In some instances, the FSMED desalinization system 100 can have one or two evaporation/distillation tanks. In other instances, the FSMED desalinization system 100 can have four or five evaporation/distillation tanks. In yet other instances, the FSMED desalinization system 100 can have up to twenty evaporation/distillation tanks.

Heating elements 80 and 90 can be any means of heating known to one of ordinary skill in the art. In some instances, heating elements 80 and 90 concentrate solar energy and convert the concentrated solar energy into thermal energy. In other instances, heating elements 80 and 90 may utilize waste heat from industrial processes. In yet other instances, the heating elements 80 and 90 can include thermal jackets, metal or alloy resistance heating elements, a ceramic heating elements, or polymeric heating elements made of, for example, a silicone (PTC) rubber.

Condensation tubes 42, 52, 54, 62, 63, and 64 can be any suitable heat exchanger, made of any suitable material, known to one of ordinary skill in the art. In some instances, one or more condensation tubes 42, 52, 54, 62, 63, and 64 can be coiled tubing. In other instances, one or more condensation tubes 42, 52, 54, 62, 63, and 64 can be radiator assemblies. In yet other instances, one or more condensation tubes 42, 52, 54, 62, 63, and 64 can be steam surface condensers.

In some instances, one or more of the conduits described in FIG. 1 can be insulated or uninsulated. In some instances, one or more of the conduits described in FIG. 1 can incorporate bi-directional flow or one-way check valves to fully or partially restrict or control the flow fluids from one component to another. In some instances, one or more of the conduits described in FIG. 1 can incorporate injection ports to inject one or more additives into the desired portions of FSMED desalinization system 100 such as, for example, descaling agents, tracer dyes, acids or bases, surfactants, compressed gases, or any other suitable additive. In some instances, one or more of the conduits described in FIG. 1 can incorporate maintenance ports for entry into the one or more conduits for maintenance and/or repair.

Figure 2:
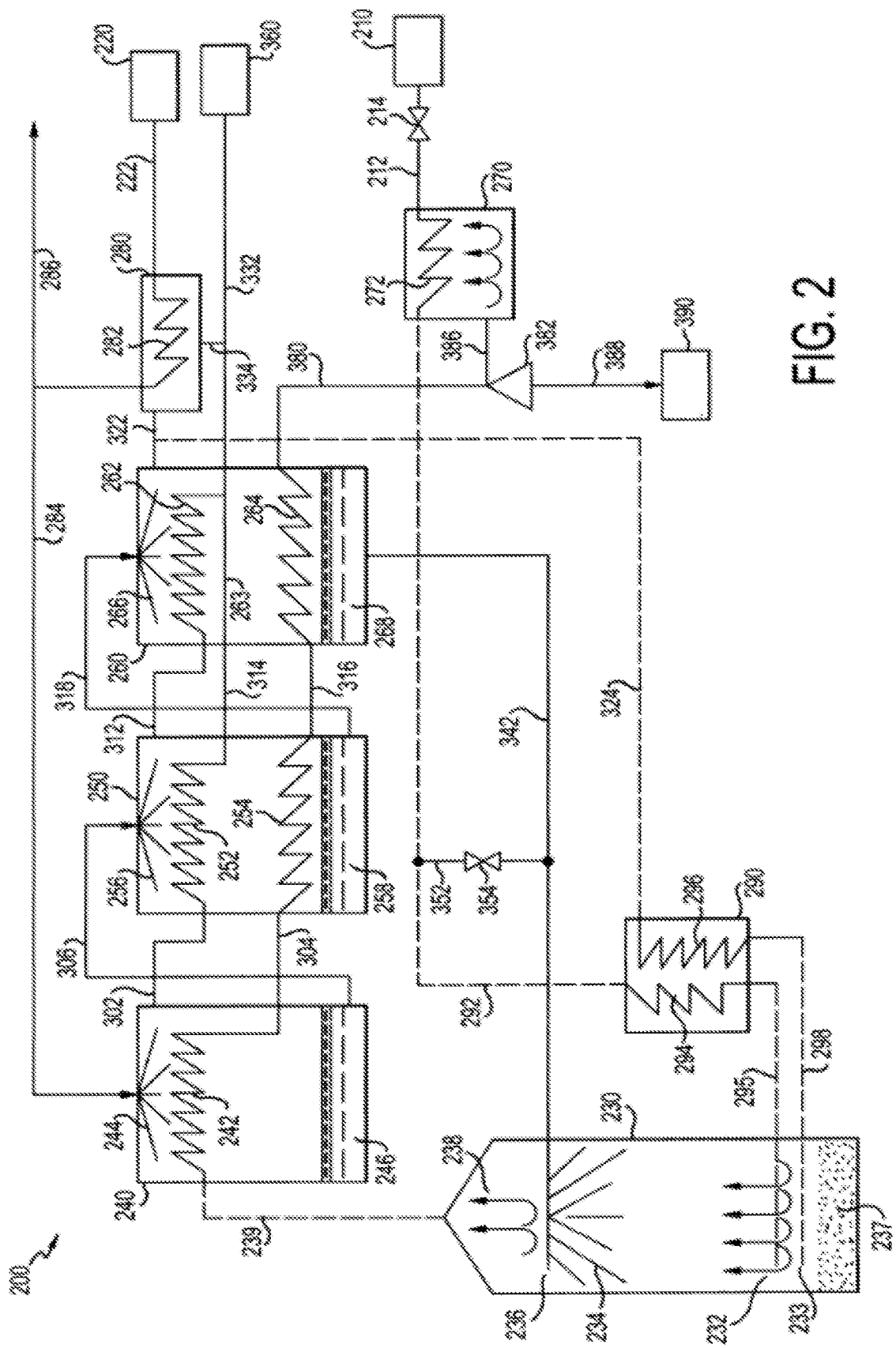
FIG. 2 is a schematic illustration of another full-separation multi-effect distillation (FSMED) desalinization system wherein a full-separation tank (FST) is integrated with a forward feed multi-effect distillation (MED) system in accordance with various aspects of the present disclosure.

FIG. 2 is a schematic illustration of another full-separation multi-effect distillation (FSMED) desalinization system wherein a full separation tank (FST) is integrated with a forward feed multi-effect distillation (MED) system in accordance with various aspects of the present disclosure. The FSMED desalinization system 200 includes a dry air source 210, a saltwater/brackish water source 220, a full-separation tank (FST) 230, a first evaporation/distillation tank 240 (also described herein as a first effect), a second evaporation/distillation tank 250 (also described herein as a second effect), and a third evaporation/distillation tank 260 (also described herein as a third effect). Dry air is transmitted from the dry air source 210 to a heating element 270 via a conduit 212 to heat the dry air as it travels through coiled tubing 272. The conduit 212 can have a valve 214 to fully or partially restrict or control the flow of dry air from the dry air source 210 to the heating element 270. The heated dry air is then transmitted to a heating element 290 via a conduit 292. Steam is also transmitted to the heating element 290 from the third evaporation/distillation tank 260 via a conduit 324 as will be further described below. The heated dry air passes through coiled tubing 294 and is further heated by the heating element 290. The steam from the third evaporation/distillation tank 260 passes through coiled tubing 296 and is also heated by the heating element 90. The heated dry air and steam can be heated from about 100° C. to about 1000° C., alternatively about 100° C. to about 800° C., alternatively about 100° C. to about 600° C., and alternatively about 100° C. to about 400° C. in the heating element 290. The heated dry air and steam are then transmitted to the FST 230 via conduits 295 and 298 respectively, and are emitted into a lower interior location of the FST 230 as a hot air 232 and heated steam 233. A final concentrated brine solution 268 is transmitted to an upper interior portion of the FST 230 from the third evaporation/distillation tank 260 via a conduit 342 as will be further discussed below. The concentrated brine solution 268 is converted to a droplet spray 234 by an atomizer 236. The atomizer 236 can have any configuration that allows for the conversion of the concentrated brine solution 268 to droplets of concentrated brine. The droplets of the spray 234 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm.

In some instances, the heated dry air can be added to the concentrated brine solution 268 from the conduit 292 to the conduit 342 via a conduit 352. The conduit 352 can have a valve 354 to fully or partially restrict or control the flow of the heated dry air from the conduit 292 to the conduit 342.

Figure 3:
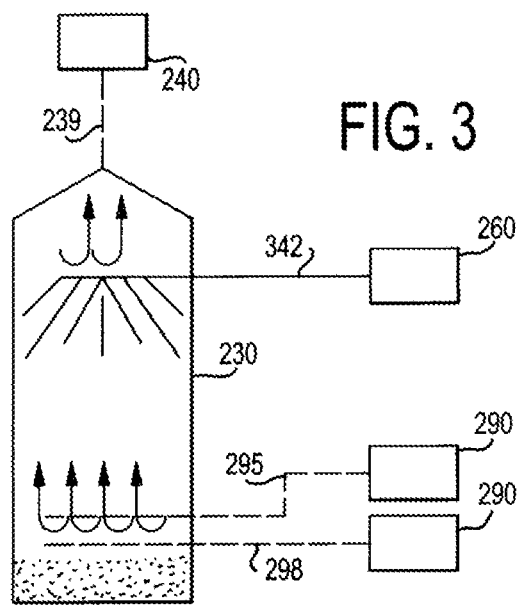
FIG. 3 is a schematic illustration of the FST of FIG. 2 in operation in accordance with various aspects of the present disclosure.

In the FST 230 the droplet spray 234 is heated by the hot air 232 and heated steam 233 causing the droplet spray 234 to evaporate to form solid salt/dry material 237, which can collect at the bottom of the FST 230, and steam 238. The steam 238 is then transmitted from the FST 230 to the first evaporation/distillation tank 240 via a conduit 239. FIG. 3 is an enlarged schematic illustration of the FST 230 of FIG. 2 in operation in accordance with various aspects of the present disclosure.

Referring again to FIG. 2, cold saltwater/brackish water is transmitted from the saltwater/brackish water source 220 to a heating element 280 via a conduit 222. The cold saltwater/brackish water passes through coiled tubing 282 and is heated by steam. The steam is supplied by the third evaporation/distillation tank 260 via a conduit 322 as will be discussed further below. Heated saltwater/brackish water is then transmitted from the heating element 280 to the first evaporation/distillation tank 240 via conduit 284. If necessary, the heated saltwater/brackish water from the system 200 via conduit 286.

Figure 4:
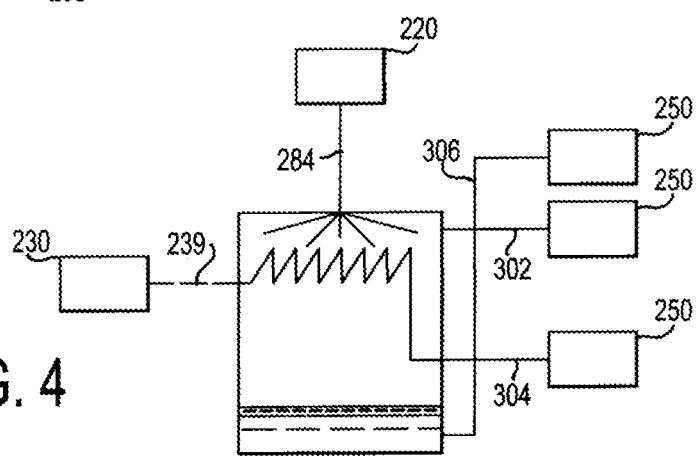
FIG. 4 is a schematic illustration of a first effect of a system and method in accordance with various aspects of the present disclosure.
Figure 5:
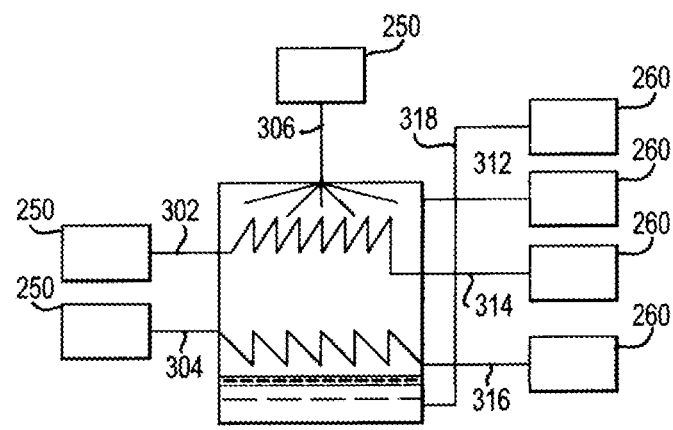
FIG. 5 is a schematic illustration of an example of downstream effects following the first effect in accordance with various aspects of the present disclosure, wherein flow from the first effect is received and steam and concentrated solute are discharged to follow-on effects.

In the first evaporation/distillation tank 240, heated saltwater/brackish water from the heating element 280 is converted to a droplet spray 244 by an atomizer (not shown), and the steam transmitted from the FST 230 to the first evaporation/distillation tank 240 via conduit 239 is circulated into a condensation tube 242. The atomizer can have any configuration that allows for the conversion of the heated saltwater/brackish water to droplets of saltwater/brackish water. The droplets of the spray 244 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. Heat from the steam is transferred to the condensation tube 242 and radiates into the first evaporation/distillation tank 240. The steam concomitantly cools and condenses to form liquid water in the condensation tube 242. The radiant heat heats the droplets of the spray 244, converting the droplets to steam and a first concentrated brine solution 246. The steam formed in the first evaporation/distillation tank 240 is then transmitted to the second evaporation/distillation tank 250 via a conduit 302. The condensed water and any steam remaining in the condensation tube 242 is transmitted to the second evaporation/distillation tank 250 via conduit 304. The first concentrated brine solution 246 is transmitted to the second evaporation/distillation tank 250 via conduit 306. FIG. 4 is an enlarged schematic illustration of the first evaporation/distillation tank 240 (also referred to herein as the first effect) of the system of FIG. 2 in accordance with various aspects of the present disclosure Referring again to FIG. 2, in the second evaporation/distillation tank 250, the first concentrated brine solution 246 from the first evaporation/distillation tank 240 is converted to a droplet spray 256 by an atomizer (not shown). The atomizer can have any configuration that allows for the conversion of the first concentrated brine solution 246 to droplets of concentrated brine. The droplets of the spray 256 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. The steam transmitted from the first evaporation/distillation tank 240 via conduit 302 is circulated through a condensation tube 252. The condensed water and any remaining steam, transmitted from the first evaporation/distillation tank 240 via conduit 304, is circulated through a condensation tube 254. Heat from the condensed water and/or steam is transferred to the condensation tubes 252, 254 and radiates into the second evaporation/distillation tank 250. The steam concomitantly cools and condenses to form liquid water in the condensation tubes 252, 254. The radiant heat heats the droplets of the spray 256, converting the droplets to steam and a concentrated brine which combines with the first concentrated brine solution 246 to form a second concentrated brine solution 258. The steam formed in the second evaporation/distillation tank 250 is then transmitted to the third evaporation/distillation tank 260 via a conduit 312. The condensed water and any steam remaining in the condensation tube 252 is transmitted to the third evaporation/distillation tank 260 via conduit 1314. The condensed water and any steam remaining in the condensation tube 254 is transmitted to the third evaporation/distillation tank 260 via conduit 316. The second concentrated brine solution 258 is transmitted to the third evaporation/distillation tank 260 via conduit 318. FIG. 5 is an enlarged schematic illustration of second evaporation/distillation tank 250 (also referred to herein as the second effect) in accordance with various aspects of the present disclosure.

Referring again to FIG. 2, in the third evaporation/distillation tank 260, the second concentrated brine solution 258 from the second evaporation/distillation tank 250 is converted to a droplet spray 266 by an atomizer (not shown). The atomizer can have any configuration that allows for the conversion of the concentrated brine to droplets of concentrated brine. The droplets of the spray 266 can have average diameters of about 10 micrometers (μm) to about 2000 μm, alternatively about 10 μm to about 1000 μm, alternatively about 10 μm to about 500 μm, alternatively about 100 μm to about 500 μm, alternatively about 100 μm to about 1000 μm alternatively about 1000 μm to about 2000 μm, and alternatively about 500 μm to about 1500 μm. The steam, transmitted from the second evaporation/distillation tank 250 via conduit 312 is circulated through a condensation tube 262. The condensed water and any remaining steam, transmitted from the second evaporation/distillation tank 250 via conduits 314, 316, is circulated through a condensation tubes 263, 264. Heat from the condensed water and/or steam is transferred to the condensation tubes 262, 263, 264 and radiates into the third evaporation/distillation tank 260. The steam concomitantly cools and condenses to form liquid water in the condensation tubes 262, 263, 264. The radiant heat heats the droplets of the spray 266, converting the droplets to steam and a concentrated brine which combines with the second concentrated brine solution 258 to form the final concentrated brine solution 268. The steam formed in the third evaporation/distillation tank 260 is then transmitted to the heating element 280 via a conduit 322. A portion of the steam formed in the third evaporation/distillation tank 260 is also transmitted to the heating element 290 via the conduit 324 as discussed above. The conduit 324 can have a valve (not shown) to fully or partially restrict or control the flow of steam from the conduit 322 to the heating element 290. The condensed water and any steam remaining in the condensation tube 262 is transmitted to the condensation tube 263.

The water and any steam remaining in the condensation tube 263 exits the third evaporation/distillation tank 260 via conduit 332. Liquid water in the conduit 332, now purified, is transmitted to a pure water storage 360. The steam transmitted to the heating element 280 via a conduit 322 heats the cold saltwater/brackish water circulating through the coiled tubing 282. As the steam heats the cold saltwater/brackish water, the corresponding energy loss causes the steam to condense and form purified liquid water in the heating element 280 which is transmitted to the pure water storage 260 via conduits 334 and 332.

The liquid water in the condensation tube 264 exits the third evaporation/distillation tank 260 via conduit 380. The liquid water and hot air are diverted into two different paths using a liquid/gas separator 382, wherein the liquid water, now purified, is transmitted to a pure water storage 290 via conduit 388 and hot air is transmitted to the heating element 270 via conduit 386 to heat the dry air from the dry air source 210 as discussed above.

In FIG. 2, the FSMED desalinization system 200 is illustrated as having three evaporation/distillation tanks 240, 250 and 260, respectively. In some instances, the FSMED desalinization system 200 can have one or two evaporation/distillation tanks. In other instances, the FSMED desalinization system 200 can have four or five evaporation/distillation tanks. In yet other instances, the FSMED desalinization system 200 can have up to twenty evaporation/distillation tanks.

Heating elements 270, 280 and 290 can be any means of heating known to one of ordinary skill in the art. In some instances, heating elements 270, 280 and 290 concentrate solar energy and convert the concentrated solar energy into thermal energy. In other instances, heating elements 80 and 270, 280 and 290 may utilize waste heat from industrial processes. In yet other instances, the heating elements 270, 280 and 290 can include thermal jackets, metal or alloy resistance heating elements, a ceramic heating elements, or polymeric heating elements made of, for example, a silicone (PTC) rubber.

In some instances, the FSMED desalinization system 200 can be modified to utilize the humidifier 70 of FIG. 1 instead of the heating element 270 and coiled tubing 272.

Condensation tubes 242, 252, 254, 262, 263, and 264 can be any suitable heat exchanger, made of any suitable material, known to one of ordinary skill in the art. In some instances, one or more condensation tubes 242, 252, 254, 262, 263, and 264 can be coiled tubing. In other instances, one or more condensation tubes 242, 252, 254, 262, 263, and 264 can be radiator assemblies. In yet other instances, one or more condensation tubes 242, 252, 254, 262, 263, and 264 can be steam surface condensers.

In some instances, one or more of the conduits described in FIG. 2 can be insulated or uninsulated. In some instances, one or more of the conduits described in FIG. 2 can incorporate bi-directional flow or one-way check valves to fully or partially restrict or control the flow fluids from one component to another. In some instances, one or more of the conduits described in FIG. 2 can incorporate injection ports to inject one or more additives into the desired portions of FSMED desalinization system 200 such as, for example, descaling agents, tracer dyes, acids or bases, surfactants, compressed gases, or any other suitable additive. In some instances, one or more of the conduits described in FIG. 2 can incorporate maintenance ports for entry into the one or more conduits for maintenance and/or repair.

System Energy and Mass Balance

The following analysis calculates the energy at water mass balance in order to quantify the energy consumption for water treatment at different temperatures for the hot flow going into the FST. The given conditions for the operation and analysis are as follows:

The steam and air mixture leaving FST are at 100° C. saturated condition;

The feed seawater entering the first effect (that is, the first evaporation/distillation tank) is assumed to be 15° C. lower than the temperature of the last effect;

The first effect is assumed to be at 90° C. saturated condition;

Each subsequent effect has a temperature drop of 10° C. from that of the previous effect;

Steam from FST gives up latent heat in the first effect;

Air is rejected at 15° C. higher than ambient temperature from air heater;

Cooling seawater is rejected at 15° C. lower than temperature of the last effect;

Specific heat capacity of air is assumed to be 1.035 kJ/kg/K and constant at all temperatures;

Steady state condition is assumed for all devices; and

It is also assumed that the FST, the effects, and heat exchangers (that is, condensation tubes) are all perfectly insulated.

The energy and water mass balance equations for each component are described in the following equations.

Energy balance: $m_a C_{p,air}(T_{hs}-T_{fst})+m_{brine,ls}h_{f,brine,ls}+m_{bs}h_{g,bs}=m_s C_{p,salt}(T_{fst}-25)+m_{st,fst}h_{g,st,fst}$ (1)

Mass Balance: $m_{brine,ls}+m_{bs}=m_s+m_{st,fst}$ (2)

Salinity Balance: $m_s=m_{brine,ls}X_{brine,ls}/1000$ (3)

In both FIGS. 1 and 2, the first evaporation/distillation tank, or effect, has only one bank of heat exchanger tubes. Hot air and steam cause a part of incoming feed seawater to evaporate and the resulting steam goes to the next evaporation/distillation tank, or effect. The remaining part of the incoming feed seawater is a concentrated brine which goes to the next effect as well. In turn, the steam condenses to form a saturated liquid and is used in subsequent effects to evaporate brine.

Energy balance: $m_{st,fst}h_{g,st,fst}m_{sw}h_{f,sw,whi}+m_{st,fst}h_{f,w,el}+m_{st,el}h_{g,el}+m_{brine,el}h_{f,b,el}$ (4)

Mass Balance: $m_{sw}=m_{brine,el}+m_{st,el}$ (5)

Salinity Balance: $X_{brine,el}=X_{sw}m_{sw}/m_{brine,el}$ (6)

After the first effect, each effect receives flow from the previous effect, and discharges steam and concentrated brine to the next effect as described in the following equations:

Energy balance: $m_a C_{p,air}(T_{fst}-T_{out,ei})+m_{st,el}h_{g,ei}+m_{brine,ei}h_{f,brine,ei}+m_{st,el}h_{g,el}+m_{fst}h_{f,w,out,ei}=m_{st,ej}h_{g,ej}+m_{w,ej}h_{f,ej}+m_{brine,ej}h_{f,brine,ej}+m_{fst}h_{w,out,ej}$ (7)

Mass Balance: $m_{brine,ei} = m_{brine,ej} + m_{st,ej}$ (8)

Salinity Balance: $X_{brine,ei} = X_{sw} m_{sw}/m_{brine,el}$ (9)

Water/steam heater energy balance: $(m_{st,ls} - m_{bs})(h_{g,ls} - h_{f,w,ls}) = m_{csw} C_{p,sw}(T_{ls} - (T_{amb} + 15))$ (10)

where $m_{bs} = b_f m_{st,ls}$ (11)

The equations developed in the previous section are system of nonlinear equations. These equations can be solved using MATLAB using trust region deficit algorithm. The algorithm requires initial guess of solution, hence the obtained solution can be checked with different initial values for confirming uniqueness. The thermal properties of sea water and brine can be obtained using property function by Sharqawy et al. The properties take temperature and salinity as argument. The enthalpy values of seawater have a better correlation with experimental data for salinity range of 0 to 120 g/kg. This limitation is due to unavailability of data for heat of mixing over 120 g/kg salinity according to Sharqawy et al. However, beyond 120 g/kg salinity the contribution from heat of mixing is not accounted for. Thus in the simulation and mathematical model this contribution is ignored and considered as an approximation. Thermal properties of water can be obtained from a MATLAB implementation of IAPWS IF97 standard formulation, as developed by Holmgren. In Equation (11), average specific heat capacity of seawater over a temperature range of 50° C. to 70° C. can be used to avoid use of a thermal property function. This can help in reducing non linearity of the system.

The simulation computation can be performed for two different schemes of FSMED systems in accordance with various aspects of the present disclosure. The input parameters for the program are the temperature of the heating steam and air, the temperature inside FST, and the temperatures of the evaporation effects. The mass flow rates of all the streams, the exit temperature of incoming air from the air heater, and the energy consumption are the output. All the simulations can be performed using a 1 kg/s mass flow rate of feed seawater.

Heat/Mass Transfer of a Single Droplet in the FST

The full separation of salts and water in the FST involves heat and mass transfer. A question on the design of the FST is the correlation of droplet lifetime (or the traveling length during dropping) and the hot air/steam temperature as well as flow velocity.

Figure 6:
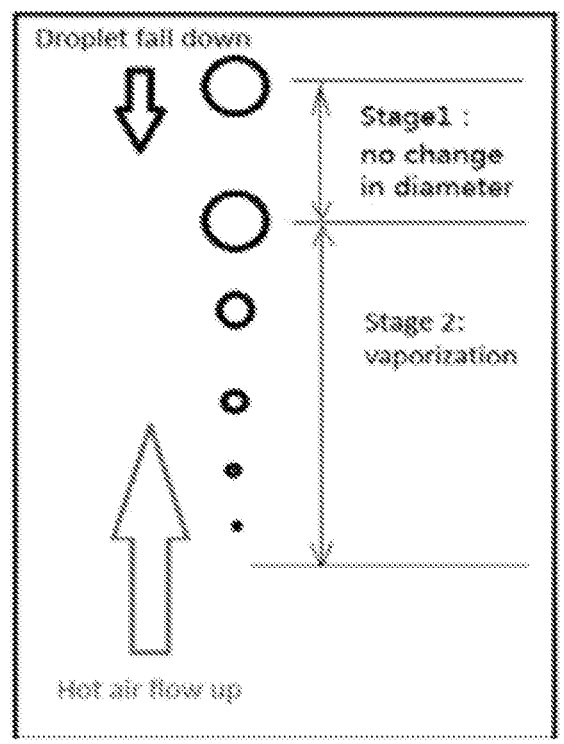
FIG. 6 is a schematic illustration of volumetric variation of a water droplet in systems and methods in accordance with various aspects of the present disclosure.

FIG. 6 is a schematic illustration of volumetric variation of a water droplet in systems and methods in accordance with various aspects of the present disclosure. As illustrated, a water droplet initially experiences a heating up with no volume change. Then, as the volume of the droplet diminishes, the volume evaporates. The droplet size change is related to the heat/mass transfer that determines the evaporation of the mass of the droplet. The related equations are:

$$-\frac{d}{dt}\left(-\frac{4}{3}\pi r_s^3 \rho_l\right) = G$$ (13)

where G is the evaporation mass, which is either dominated by the heat transfer or mass transfer, whichever is limiting. The heat transfer equation is:

$2\pi r_s \lambda_m (T_\infty - T_s) Nu = GL$ (14)

where L is the latent heat. Similarly, the mass transfer question is $G = 2\pi r_s \rho_m D_m Sh$ (15)

The heat and mass transfer coefficients for the above equations are as follows:

$Nu = 2.0 + 0.552 Re^{1/2} P_l^{1/3}$ (16)

$Sh = 2.0 + 0.552 Re^{1/2} S_c^{1/3}$ (17)

The velocity (u) of the droplet is determined based on the balance of the forces applied on the droplet as follows:

$$u = \sqrt{\frac{4\rho_l g d}{3\rho_m C_d}} \; [m/s]$$ (18)

where $\rho_l$ is the density of droplet (liquid water) at 100° C. (958.4 kg/m$^3$), g is the gravitational acceleration (9.81 m/s$^2$); d is the droplet diameter ($2r_s$); $\rho m$ (0.5977 kg/m$^3$) is the density of mixture gas (air and steam) at surface at 100° C., and $C_d$ is the drag coefficient under sedimentation velocity, which depends on Reynolds number (Re) of the droplet as follows:

$$C_d = \left(\left(\frac{a}{Re}\right)^c + b^c\right)^{\frac{1}{c}}$$ (19)

where a, b, and c are constants equaling 24, 0.32 and 0.52, respectively. Re can be calculated as follows:

$$Re = \frac{ud}{v}$$ (20)

where v is the dynamic viscosity of hot air. The force balance for a droplet is as follows:

$ma = mg - F_{air-float}$ where m is the mass of the droplet and equals $\rho_l * V$; a is the acceleration of the droplet; g is the gravitational acceleration as defined above, and $F_{air-float}$ is the drag force due to air resistance. $F_{air-float}$ can be calculated as follows:

$$F_{air-float} = \frac{1}{2} C_d \rho_m S u^2$$ (21)

where S is the effective area of the droplet. Iterative computation will be able to calculate the droplet size and its travel length at a certain time during its descending process before full vaporization.

RESULTS AND DISCUSSION

Figure 7:
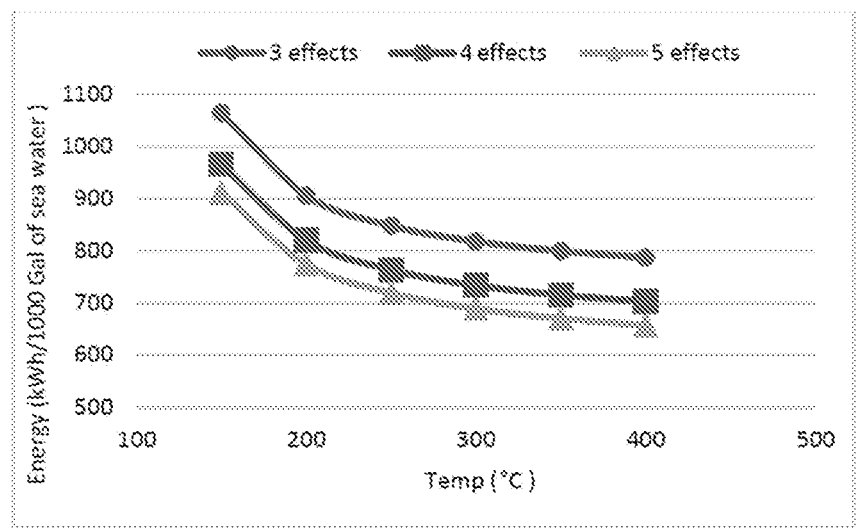
FIG. 7 is a graphical display depicting thermal energy consumption during the treatment of seawater in accordance with various aspects of the present disclosure.

FIG. 7 is a graphical display depicting thermal energy consumption during the treatment of seawater in accordance with various aspects of the present disclosure. Specifically, FIG. 7 shows the thermal energy consumption for the FSMED system illustrated in FIG. 1. The minimum energy consumption is 658 kWh (thermal)/1000 Gallons (173.83 kWh/m$^3$) of seawater. Table 1 shows average value of salinity for system with 3, 4 and 5 effects referring to FIG. 1. The difference between salinity of last effect and the previous one is significantly large. The high salinity brine in the last effect is directed to the FST so that salts and water are fully separated. The energy consumption decreases with increasing hot air temperature because of the decrease in required mass flow of air. The required mass flow of air also decreases with higher hot air temperature because of better heat transfer in the FST due a high temperature gradient between the surrounding air and brine droplet. Similarly, the energy consumption decreases if total number of effects is increased because the amount of brine produced in last effect decreases with increase in total number of effects. Which in turn results in less amount of brine being sent to FST and thus requiring lower energy for evaporation.

TABLE 1

Salinity (in g of dissolved salts/kg of water) of brine for systems having different numbers of evaporation/distillation tanks (effects)

| Brine Stream | 3 Effects | 4 Effects | 5 Effects |
|---|---|---|---|
| Effect 1 | 43.6 | 40 | 38.5 |
| Effect 2 | 61.7 | 51 | 45 |
| Effect 3 | 117.8 | 72 | 56 |
| Effect 4 | N/A | 138 | 80 |
| Effect 5 | N/A | N/A | 155 |

Figure 8:
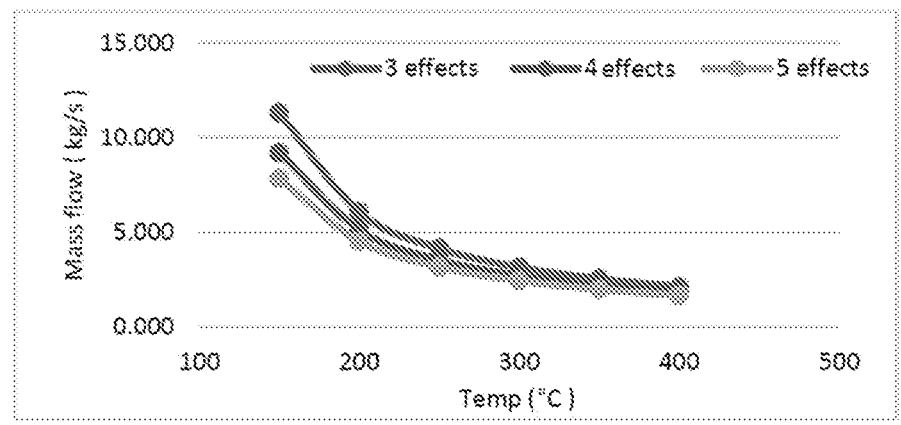
FIG. 8 is a graphical display depicting flowrate in kilograms per second (kg/s) of needed dry air at varying temperatures in accordance with various aspects of the present disclosure.

The needed dry airflow rate is shown in FIG. 8. In order to lower the energy consumption, the system was modified by incorporating a steam bleed and air recovery, which is shown in FIG. 2, where a fraction of steam is bled from the last effect and air is circulated back to the heat source instead of releasing it to atmosphere. This forms a close loop of air. Both air and the steam are used as the fluid to carry thermal energy to the FST. The fraction of steam bleed at location 10 in FIG. 2 is listed in Table 2 for the system with 3, 4, and 5 effects, respectively.

TABLE 2

Fraction of steam bleeding in the desgin of FIG. 2

| Number of Effects | Bleed Fraction (bf) |
|---|---|
| 3 | 0.6 |
| 4 | 0.57 |
| 5 | 0.55 |

Figure 9:
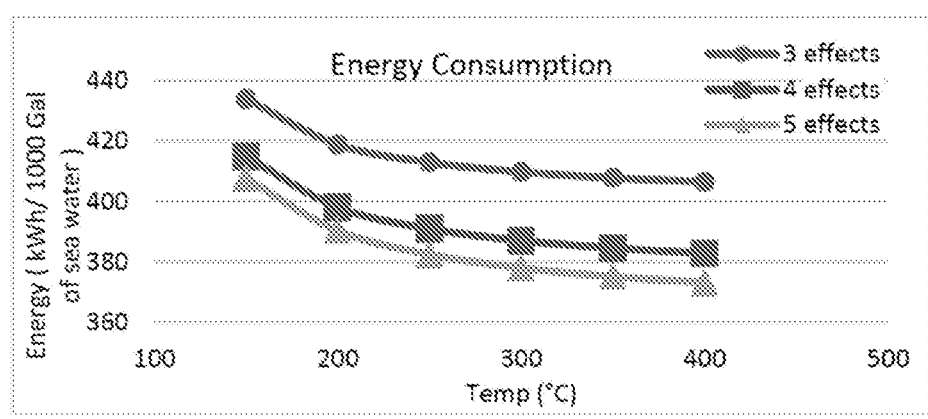
FIG. 9 is a graphical display depicting thermal energy consumption during the treatment of seawater with steam bleeding in accordance with various aspects of the present disclosure.
Figure 10:
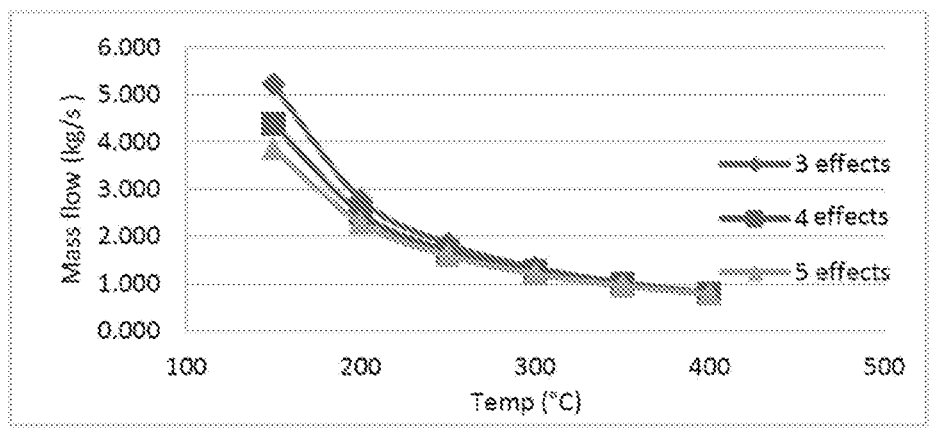
FIG. 10 is a graphical display depicting flowrate in kg/s of needed dry air at varying temperatures with steam bleeding in accordance with various aspects of the present disclosure.
Figure 11:
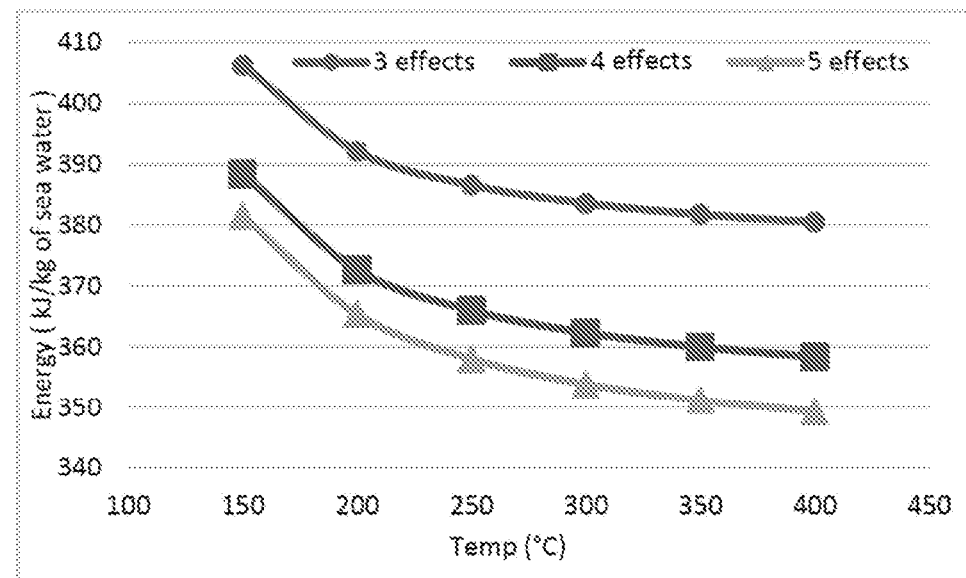
FIG. 11 is a graphical display depicting energy consumption per kilogram of seawater at different temperatures with steam bleeding in accordance with various aspects of the present disclosure.

When bleeding steam is used, the minimum energy consumption possible for the case with 5 effects is dramatically reduced to a value of 373 kWh (thermal)/1000 Gallons (98.47 kWh/m$^3$). The energy consumption and needed flow rate of dry air are given in FIGS. 9 and 10, respectively. The energy consumption in terms of per kilogram of seawater is given in FIG. 11. It can be seen that the current system is able to obtain both water and salts at an energy cost of 300-400 kJ/kg which is comparable to low temperature MED systems that have no 100% extraction of water.

The salinity of the brine at the last effect with a heating source temperature of 400° C. is listed in Table 3. The brine at this salinity is fed to the FST to obtain all the salts. A comparison of Table 1 and Table 3 shows that the salinity of the last effect increases due to the use of the bleed steam. It is also observed that the salinity of the last effect increases with an increase in the total number of effects in the system. A bleeding fraction higher than 0.6 is not suitable because it significantly increases salinity of the brine in the last effect, which can cause operational problems.

TABLE 3

Salinity (in g of dissolved salts/kg of water) of brine for systems having different numbers of evaporation/distillation tanks (effects) in the design of FIG. 2 at a bleed fraction of 0.5 and a heating source temperature of 400° C.

| Brine Stream | 3 Effects | 4 Effects | 5 Effects |
|---|---|---|---|
| Effect 1 | 46.4 | 42.5 | 40.2 |
| Effect 2 | 71.9 | 56.1 | 48.7 |
| Effect 3 | 170.36 | 85.6 | 63.9 |
| Effect 4 | N/A | 193.9 | 96.5 |
| Effect 5 | N/A | N/A | 210.5 |

Figure 12:
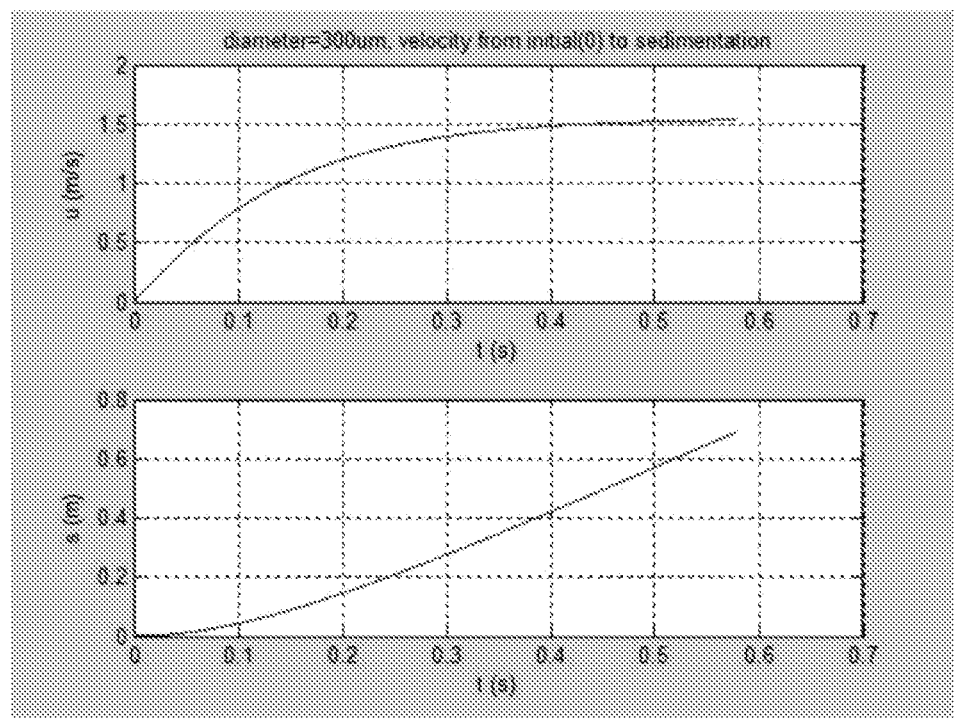
FIG. 12 is a graphical display depicting seawater droplet traveling velocity and distance in stage 1 of the systems and methods in accordance with various aspects of the present disclosure.
Figure 13A:
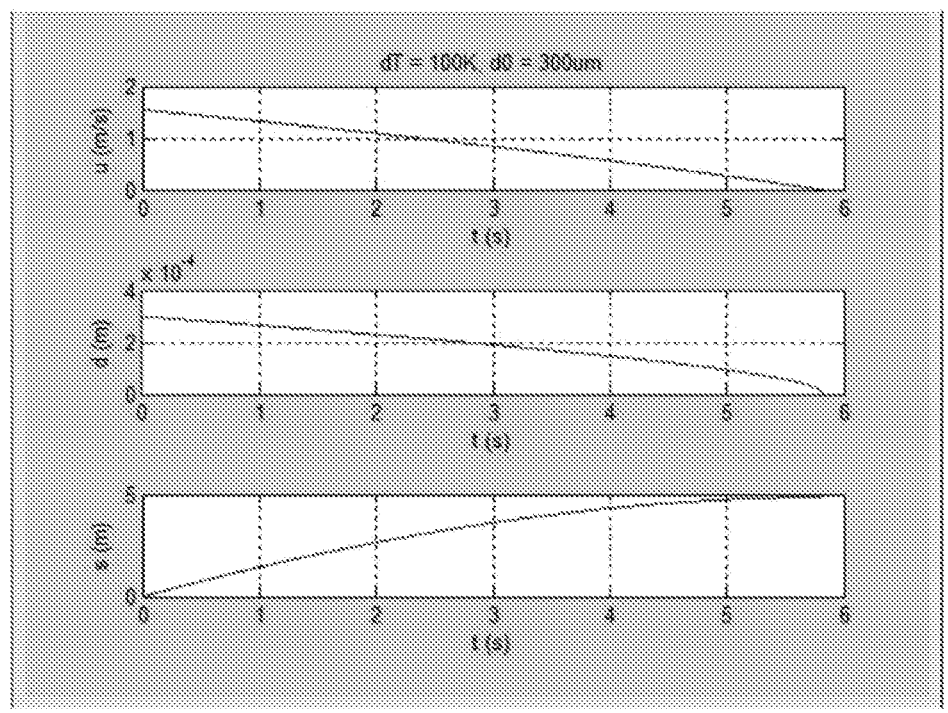
FIG. 13a is a graphical display depicting seawater droplet traveling velocity and distance in stage 2 in accordance with various aspects of the present disclosure, wherein $\Delta T=100°$ C.
Figure 13B:
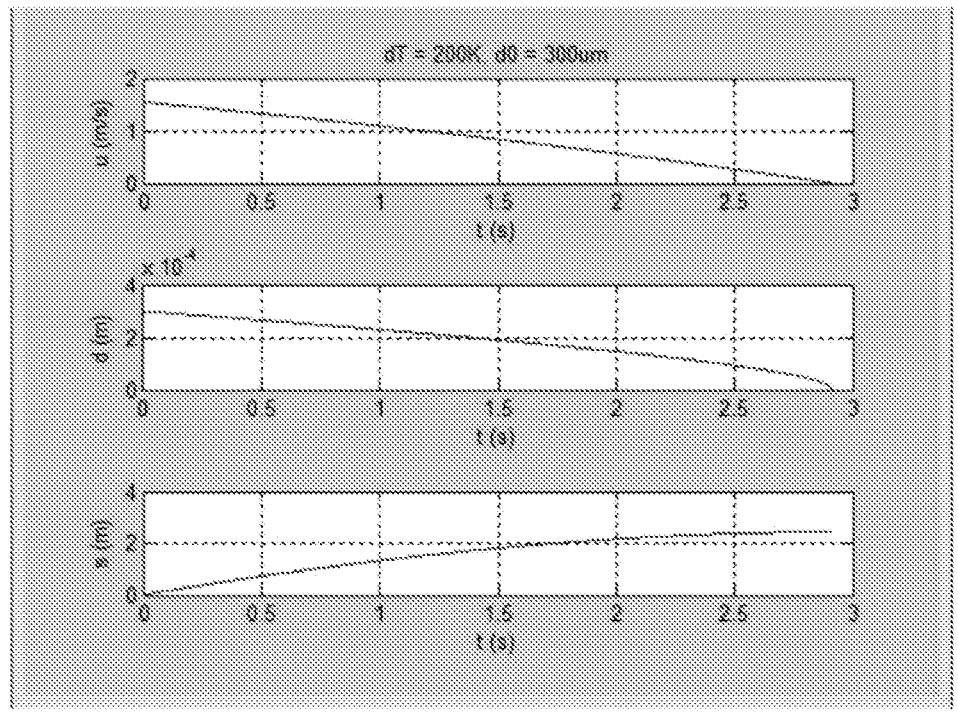
FIG. 13b is a graphical display depicting seawater droplet traveling velocity and distance in stage 2 in accordance with various aspects of the present disclosure, wherein $\Delta T=200°$ C.
Figure 14:
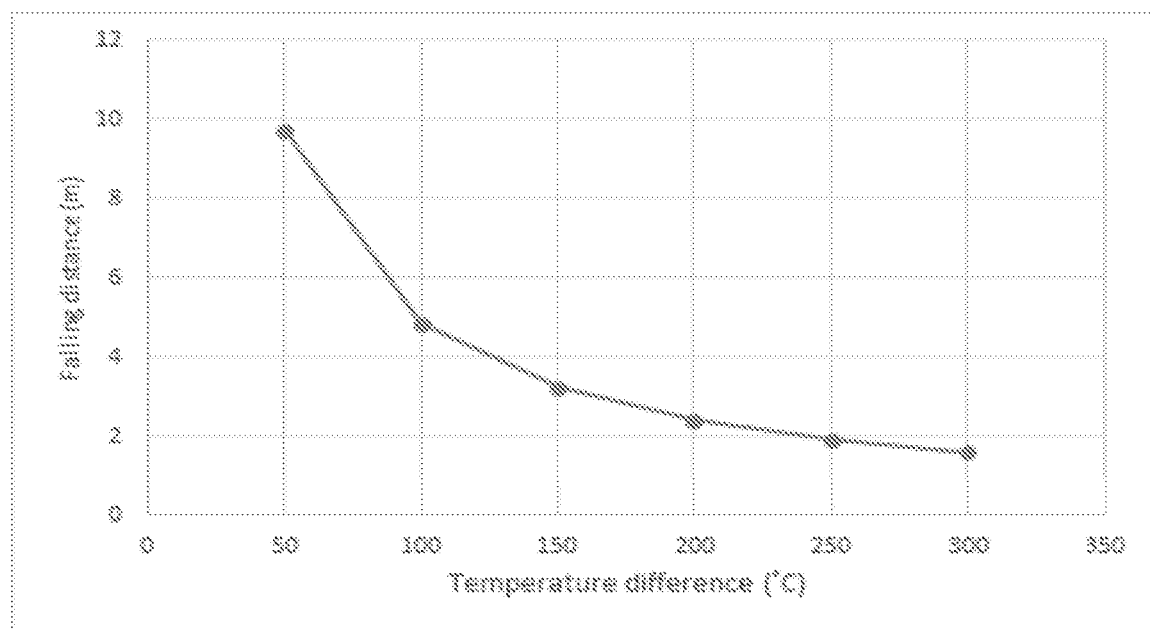
FIG. 14 is a graphical display depicting falling distance during the lifetime of a droplet at varying temperature differences in accordance with aspects of the present disclosure.

It has also been found that a droplet travels a short distance in stage 1 to reach a saturate temperature. For a droplet of 300 μm, the velocity and travel distance is shown in FIG. 12. As can be seen in FIG. 12, stage 1 takes a rather short time and distance for the droplet. For the stage 2, the evaporation stage, the traveling time, distance, and the droplet size are given for two cases with different hot air temperatures in FIGS. 13a and 13b, respectively. The falling distance in the lifetime of the droplet is affected by the dry air temperature (or difference of temperature between the dry air and water) as shown in FIG. 14. It is obvious that a larger temperature difference results in a shorter traveling distance of the droplet.

The foregoing disclosure describes the performance of a novel desalinization system to extract 100% of the water and the solute (salts) for valuable products. The simulation results gave an idea of behavior of an MED system coupled with an FST. The temperatures of evaporation effects had been kept below 100° C. to reduce scaling problems. The model and program is an effective tool for analysis of FSMED and is a gateway to further analysis of the system. In addition, the energy consumption of this new desalination system compares well to that of the existing desalination facilities. In another embodiment, the seawater droplet heat/mass transfer is also analyzed. The data on the droplet traveling distance will give a good reference for the design of the FST in the system. Finally, the embodiments described herein show the feasibility of such a system which gives an important reference for the design and integration of the system.

STATEMENTS OF THE DISCLOSURE

Statements of the Disclosure include:

Statement 1: A water desalinization system, the system comprising a multi-effect distillation system comprising an evaporation/distillation tank; a separation tank; and a heated air source, wherein the system is configured such that heated air from the heated air source can be fed to the separation tank, a concentrated brine from the evaporation/distillation tank can be transmitted to the separation tank and atomized therein to form concentrated brine droplets, the concentrated brine droplets can be vaporized by the heated air and converted to a first steam and a salt/solute residue, the first steam can be transmitted from the separation tank to the a heat exchanger of the evaporation/distillation tank and condensed therein to form purified liquid water, and saltwater/brackish water can be transmitted to the multi-effect distillation system, atomized to form droplets of saltwater/brackish water, and converted to a second steam and the concentrated brine when heated in the presence of the heat exchanger.

Statement 2: A system according to Statement 1, wherein the heated air source comprises a solar energy concentrator.

Statement 3: A system according to Statement 2, wherein the solar energy concentrator is configured to concentrate solar energy and convert concentrated solar energy to thermal energy.

Statement 4: A system according to any one of Statements 1-3, wherein the multi-effect distillation system comprises at least three evaporation/distillation tanks fluidically coupled in series, each configured for the transmission of steam, purified liquid water and concentrated brine from one evaporation/distillation tank to another evaporation/distillation tank through separate conduits.

Statement 5: A system according to any one of Statements 1-4, wherein the heat exchanger is a condensation tube.

Statement 6: A system according to any one of Statements 1-5, wherein the heated air source is configured to form heated air having a temperature ranging from about 100° C. to about 400° C.

Statement 7: A system according to any one of Statements 1-6, further comprising a saltwater/brackish water heating element to heat the saltwater/brackish water prior to transmission to the multi-effect distillation system.

Statement 8: A system according to Statement 7, wherein the saltwater/brackish water heating element is fluidically coupled with the evaporation/distillation tank to transmit steam from the evaporation/distillation tank to the heating element.

Statement 9: A system according to any one of Statements 1-8, further comprising a dry air source; and a dry air humidifier coupled with the dry air source and the heated air source, wherein the humidifier is configured to add steam to the dry air to form humidified air and transmit the humidified air to the heated air source.

Statement 10: A system according to any one of Statements 1-9, further comprising a conduit to transmit steam from the evaporation/distillation tank to the heated air source, to form a hot air and steam mixture in the heated air source.

Statement 11: A water desalinization method, the method comprising supplying hot air or a hot air/steam mixture to a separation tank; converting a concentrated brine to concentrated brine droplets in the separation tank; vaporizing the concentrated brine droplets in the separation tank with the hot air or hot air/steam mixture to form a first steam and a salt/solute residue; collecting the salt/solute residue in the separation tank; transmitting the first steam to a heat exchanger in an evaporation/distillation tank of a multi-effect distillation system; transmitting saltwater/brackish water to the evaporation/distillation tank; converting the saltwater/brackish water to saltwater/brackish water droplets; vaporizing the saltwater/brackish water droplets in the evaporation/distillation tank to form a second steam and the concentrated brine; condensing the first steam to form purified liquid water in the heat exchanger; and transmitting the concentrated brine to the separation tank.

Statement 12: A method according to Statement 11, wherein the hot air or hot air/steam mixture is supplied by a heated air source comprising a solar energy concentrator.

Statement 13: A method according to Statement 11 or Statement 12, further comprising concentrating solar energy with a solar energy concentrator; converting the concentrated solar energy to thermal energy; and heating air or an air/steam mixture to form the hot air or hot air/steam mixture.

Statement 14: A method according to any one of Statements 11-13, further comprising heating the saltwater/brackish water prior to transmitting the saltwater/brackish water to the evaporation/distillation tank.

Statement 15: A method according to any one of Statements 11-14, wherein the multi-effect distillation system comprises at least three evaporation/distillation tanks fluidically coupled in series, each configured for the transmission of steam, purified liquid water and concentrated brine from one evaporation/distillation tank to another evaporation/distillation tank through separate conduits.

Statement 16: A method according to Statement 15, wherein each of the at least three evaporation/distillation tanks and the saltwater/brackish water is converted to saltwater/brackish water droplets in each evaporation/distillation tank.

Statement 17: A method according to Statement 15, wherein saltwater/brackish water is converted to saltwater/brackish water droplets and vaporized to form steam and a first concentrated brine in a first evaporation/distillation tank of the least three evaporation/distillation tanks, the first concentrated brine is converted to first concentrated brine droplets and vaporized to form steam and a second concentrated brine in a second evaporation/distillation tank of the least three evaporation/distillation tanks, and the second concentrated brine is converted to second concentrated brine droplets and vaporized to form steam and a third concentrated brine in a third evaporation/distillation tank of the least three evaporation/distillation tanks.

Statement 18: A method according to Statement 17, wherein the third concentrated brine is converted to concentrated brine droplets in the separation tank.

Statement 19: A method according to any one of Statements 11-18, further comprising transmitting the second steam to a heated air source; and forming the hot air/steam mixture in the heated air source.

Statement 20: A method according to any one of Statements 11-19, further comprising transmitting the second steam to a saltwater/brackish water heating element; and heating the saltwater/brackish water with the second steam prior to transmitting the saltwater/brackish water to the evaporation/distillation tank.

Statement 21: A thermal-driven water treatment system, the system comprising a forward feed distillation system having at least one evaporation effect and at least one heat exchanger; a full separation tank configured to receive concentrated brine from the at least one evaporation effect, wherein a supplied air feed to the full separation tank is preheated by an air/steam mixture, the water to be reclaimed is atomized into droplets and made to pass through the air/steam mixture, thereby vaporizing the water droplets and leaving a salt/solute residue to be collected at the bottom of the full separation tank.

Statement 22: A system according to Statement 21, wherein the source of thermal energy is solar power.

Statement 23: A thermal-driven method of treating water, the method comprising feeding water through a forward feed distillation system having at least one evaporation effect and at least one heat exchanger; passing said water to a full separation tank (FST) configured to receive a concentrated brine from the at least one evaporation effect, wherein a supplied air feed to the FST is preheated by an air/steam mixture, and the water to be reclaimed is atomized into droplets and made to pass through the air/steam mixture, thereby vaporizing the water droplets and leaving a salt/solute residue to be collected at the bottom of the FST.

Statement 24: A method according to Statement 23, wherein the source of thermal energy is solar power.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

REFERENCES

[1] Elimelech, M. and W. A. Phillip (2011). "The Future of Seawater Desalination: Energy, Technology, and the Environment." Science 333(6043): 712-717.
[2] Kalogirou, S. A. (2005). "Seawater desalination using renewable energy sources." Progress in Energy and Combustion Science 31(3): 242-281.
[3] Nair, M. and D. Kumar (2013). "Water desalination and challenges: The Middle East perspective: a review." Desalination and Water Treatment 51(10-12): 2030-2040.
[4] Darwish, M. et al. (2012). "Desalting seawater in Qatar by renewable energy: a feasibility study." Desalination and Water Treatment 47(1-3): 279-294.
[5] Dore, M. H. I. (2005). "Forecasting the economic costs of desalination technology." Desalination 172(3): 207-214.
[6] Turek, M. (2003). "Cost effective electrodialytic seawater desalination." Desalination 153(1-3): 371-376.
[7] G. Fiorenza et al., "Technoeconomic evaluation of a solar powered water desalination plant." Ener. Conv. Manag., 44 (2003) 2217-2240.
[8] Li, C. N. et al. (2013). "Solar assisted sea water desalination: A review." Renewable & Sustainable Energy Reviews 19: 136-163.
[9] Karagiannis, I. C. and P. G. Soldatos (2008). "Water desalination cost literature: review and assessment." Desalination 223(1-3): 448-456.
[10] S. Wu and Z. Zhang, (2003). An approach to improve the economy of desalination plants with a nuclear heating reactor by coupling with hybrid technologies, Desalination, 155, pp. 179-185.
[11] Mittelman, G. et al. (2007). "Large-scale solar thermal desalination plants: A review." Heat Transfer Engineering 28(11): 924-930.
[12] Ali, M. T. et al. (2011). "A comprehensive techno-economical review of indirect solar desalination." Renewable & Sustainable Energy Reviews 15(8): 4187-4199.
[13] Palenzuela, P. et al. (2013). "Parametric equations for the variables of a steady state model of a multi-effect desalination plant." Desalination and Water Treatment 51(4-6): 1229-1241.
[14] H. EI-Dessouky, H. Ettouney (Eds.), "Fundamentals of Salt Water Desalination." Elsevier Science BV, Amsterdam, 2002.
[15] Li, C. N. et al. (2012). "A new combined power and desalination system driven by low grade heat for concentrated brine." Energy 46(1): 582-595.
[16] Fernandez-Lopez, C. et al. (2009). "Seawater integrated desalination plant without brine discharge and powered by renewable energy systems." Desalination 235(1-3): 179-198.
[17] W. Omar et al., "Reduction of seawater scale forming potential using the fluidized bed crystallization technology." Desalination 250 (2010) 95-100.
[18] Turek, M. and P. Dydo (2003). "Hybrid membrane—thermal versus simple membrane systems." Desalination 157(1-3): 51-56.
[19] Laspidou, C. et al. (2010). "Minimizing the Environmental Impact of Sea Brine Disposal by Coupling Desalination Plants with Solar Saltworks: A Case Study for Greece." Water 2(1): 75-84.
[20] Kh. Mahkamov and J. S. Akhatov, Experimental Study of the Performance of Multieffect Solar Thermal Water Desalination System, 2008, Applied Solar Energy, 2008, Vol. 44, No. 1, pp. 31-34.
[21] Kai Wang et al. "Experimental Investigation to the Properties of Eutectic Salts by NaCl—KCl—ZnCl2 for Application as High Temperature Heat Transfer Fluids," Proceedings of the ASME 2014 8th International Conference on Energy Sustainability, ES-FuelCell2014-6578, Jun. 30-Jul. 2, 2014, Boston Mass.
[22] K. Vignarooban et al., "Corrosion resistance of Hastelloys in molten metal-chloride heat-transfer fluids for concentrating solar power Applications." Solar Energy, Volume 103, May 2014, Pages 62-69.
[23] Farahbod, F. et al. (2012). "Experimental study of forced circulation evaporator in zero discharge desalination process." Desalination 285: 352-358.
[24] Ibrahim S. Al-Mutaz, Irfan Wazeer, Development a steady state mathematical model for MEE-TVC desalination plants, Desalination 351 (2014) 9-18.
[25] Mostafa H. Sharqawy et al., Thermophysical properties of seawater: a review of existing correlations and data, Desalination and Water Treatment, 16 (2010) 354-380, April.
[26] Magus Holmgren, X STEAM FOR MATLAB, www.x-eng.com 2006-01-20.
[27] Runya Deng et al., "Integration of thermal energy and sea water desalination." Energy 35 (2010) 4368-4374.

What is claimed is:

1. A water desalinization system, the system comprising:
a multi-effect distillation system comprising an evaporation/distillation tank;
a full-separation tank; and
a source of heated air, the heated air having a temperature of ranging from about 100° C. to about 1000° C.,
wherein the water desalinization system is configured such that the heated air can be fed to the full-separation tank, a concentrated brine from the evaporation/distillation tank can be transmitted to the full-separation tank and atomized therein to form concentrated brine droplets, the concentrated brine droplets can be vaporized by the heated air and converted to a first steam and a salt/solute residue,
the first steam can be transmitted from the separation tank to a heat exchanger of the evaporation/distillation tank and condensed therein to form purified liquid water, and
saltwater/brackish water can be transmitted to the multi-effect distillation system, atomized to form droplets of saltwater/brackish water, and converted to a second steam and the concentrated brine when heated in the presence of the heat exchanger.

2. The system of claim 1, wherein the source of heated air comprises a solar energy concentrator.

3. The system of claim 2, wherein the solar energy concentrator is configured to concentrate solar energy and convert concentrated solar energy to thermal energy.

4. The system of claim 1, wherein the multi-effect distillation system comprises at least three evaporation/distillation tanks fluidically coupled in series, each configured for the transmission of steam, purified liquid water and concentrated brine from one evaporation/distillation tank to another evaporation/distillation tank through separate conduits.

5. The system of claim 1, wherein the heat exchanger is a condensation tube.

6. The system of claim 1, wherein the heated air has a temperature ranging from about 100° C. to about 400° C.

7. The system of claim 1, further comprising a saltwater/brackish water heating element to heat the saltwater/brackish water prior to transmission to the multi-effect distillation system.

8. The system of claim 7, wherein the saltwater/brackish water heating element is fluidically coupled with the evaporation/distillation tank to transmit steam from the evaporation/distillation tank to the heating element.

9. The system of claim 1, further comprising:
a dry air source; and
a dry air humidifier coupled with the dry air source and the source of heated air, wherein
the humidifier is configured to add steam to the dry air to form humidified air and transmit the humidified air to the source of heated air.

10. The system of claim 1, further comprising a conduit to transmit steam from the evaporation/distillation tank to the source of heated air, to form a hot air and steam mixture in the source of heated air.

11. A water desalinization method, the method comprising:
supplying hot air or a hot air/steam mixture to a separation tank, the hot air or the hot air/steam having a temperature of ranging from about 100° C. to about 1000° C.;
converting a concentrated brine to concentrated brine droplets in the separation tank;
vaporizing the concentrated brine droplets in the separation tank with the hot air or the hot air/steam mixture to form a first steam and a salt/solute residue:
collecting the salt/solute residue in the separation tank;
transmitting the first steam to a heat exchanger in an evaporation/distillation tank of a multi-effect distillation system;
transmitting saltwater/brackish water to the evaporation/distillation tank;
converting the saltwater/brackish water to saltwater/brackish water droplets;
vaporizing the saltwater/brackish water droplets in the evaporation/distillation tank to form a second steam and the concentrated brine;
condensing the first steam to form purified liquid water in the heat exchanger; and
transmitting the concentrated brine to the separation tank.

12. The method of claim 11, wherein the hot air or hot air/steam mixture is supplied by a source of heated air comprising a solar energy concentrator.

13. The method of claim 11, further comprising:
concentrating solar energy with a solar energy concentrator;
converting the concentrated solar energy to thermal energy; and
heating air or an air/steam mixture to form the hot air or the hot air/steam mixture.

14. The method of claim 11, further comprising heating the saltwater/brackish water prior to transmitting the saltwater/brackish water to the evaporation/distillation tank.

15. The method of claim 11, wherein the multi-effect distillation system comprises at least three evaporation/distillation tanks fluidically coupled in series, each configured for the transmission of steam, purified liquid water and concentrated brine from one evaporation/distillation tank to another evaporation/distillation tank through separate conduits.

16. The method of claim 15, wherein each of the at least three evaporation/distillation tanks and the saltwater/brackish water is converted to saltwater/brackish water droplets in each evaporation/distillation tank.

17. The method of claim 15, wherein saltwater/brackish water is converted to saltwater/brackish water droplets and vaporized to form steam and a first concentrated brine in a first evaporation/distillation tank of the least three evaporation/distillation tanks, the first concentrated brine is converted to first concentrated brine droplets and vaporized to form steam and a second concentrated brine in a second evaporation/distillation tank of the least three evaporation/distillation tanks, and the second concentrated brine is converted to second concentrated brine droplets and vaporized to form steam and a third concentrated brine in a third evaporation/distillation tank of the least three evaporation/distillation tanks.

18. The method of claim 17, wherein the third concentrated brine is converted to concentrated brine droplets in the separation tank.

19. The method of claim 11, further comprising:
transmitting the second steam to a source of heated air; and
forming the hot air/steam mixture in the source of heated air.

20. The method of claim 11, further comprising:
transmitting the second steam to a saltwater/brackish water heating element; and
heating the saltwater/brackish water with the second steam prior to transmitting the saltwater/brackish water to the evaporation/distillation tank.

21. A thermal-driven water treatment system, the system comprising:
a forward feed distillation system having at least one evaporation effect and at least one heat exchanger;
a full separation tank configured to receive concentrated brine from the at least one evaporation effect, wherein
a supplied air feed to the full separation tank is preheated by an air/steam mixture, the water to be reclaimed is atomized into droplets and made to pass through the air/steam mixture, thereby vaporizing the water droplets and leaving a salt/solute residue to be collected at the bottom of the full separation tank.

22. The water treatment system of claim 21, wherein the source of thermal energy is solar power.

23. A thermal-driven method of treating water, the method comprising:
feeding water through a forward feed distillation system having at least one evaporation effect and at least one heat exchanger;
passing said water to a full separation tank (F ST) configured to receive a concentrated brine from the at least one evaporation effect, wherein
a supplied air feed to the FST is preheated by an air/steam mixture, and the water to be reclaimed is atomized into droplets and made to pass through the air/steam mixture, thereby vaporizing the water droplets and leaving a salt/solute residue to be collected at the bottom of the FST.

24. The method of claim 23, wherein the source of thermal energy is solar power.

* * * * *